April 2, 1963 F. FROHNER 3,083,801
DRIVING DEVICE FOR MACHINES, PARTICULARLY WINDING MACHINES
Filed Dec. 22, 1959 2 Sheets-Sheet 1

INVENTOR
Fritz Frohner

BY
Bacon & Thomas
ATTORNEYS

April 2, 1963 F. FROHNER 3,083,801
DRIVING DEVICE FOR MACHINES, PARTICULARLY WINDING MACHINES
Filed Dec. 22, 1959 2 Sheets-Sheet 2

INVENTOR
Fritz Frohner
BY Bacon & Thomas
ATTORNEYS

United States Patent Office 3,083,801
Patented Apr. 2, 1963

1

3,083,801
DRIVING DEVICE FOR MACHINES, PARTICULARLY WINDING MACHINES
Fritz Frohner, Hussweg 3, Lubeck, Germany
Filed Dec. 22, 1959, Ser. No. 861,365
6 Claims. (Cl. 192—3.5)

The present invention relates to driving devices for machines requiring slow starting motion, such as winding machines or the like. Heretofore such machines were started and driven through friction drive means subject to excessive wear. The present invention provides an infinitely variable friction drive without undue wear and readily adaptable to different driving conditions.

In brief, the invention comprises a motor for driving a machine and arranged to drive through an infinitely variable transmission to a gear box or the like, the output of which is connected through a hydraulically operable friction clutch operating in a lubricant bath. In addition, there is a manually operable control member for first gradually engaging the friction clutch to establish a drive while the transmission provides the greatest mechanical advantage for the motor and to thereafter vary the ratio of the infinitely variable transmission to increase the speed of drive to the machine. The invention is shown by way of illustration in the accompanying drawings wherein:

Figure 1:
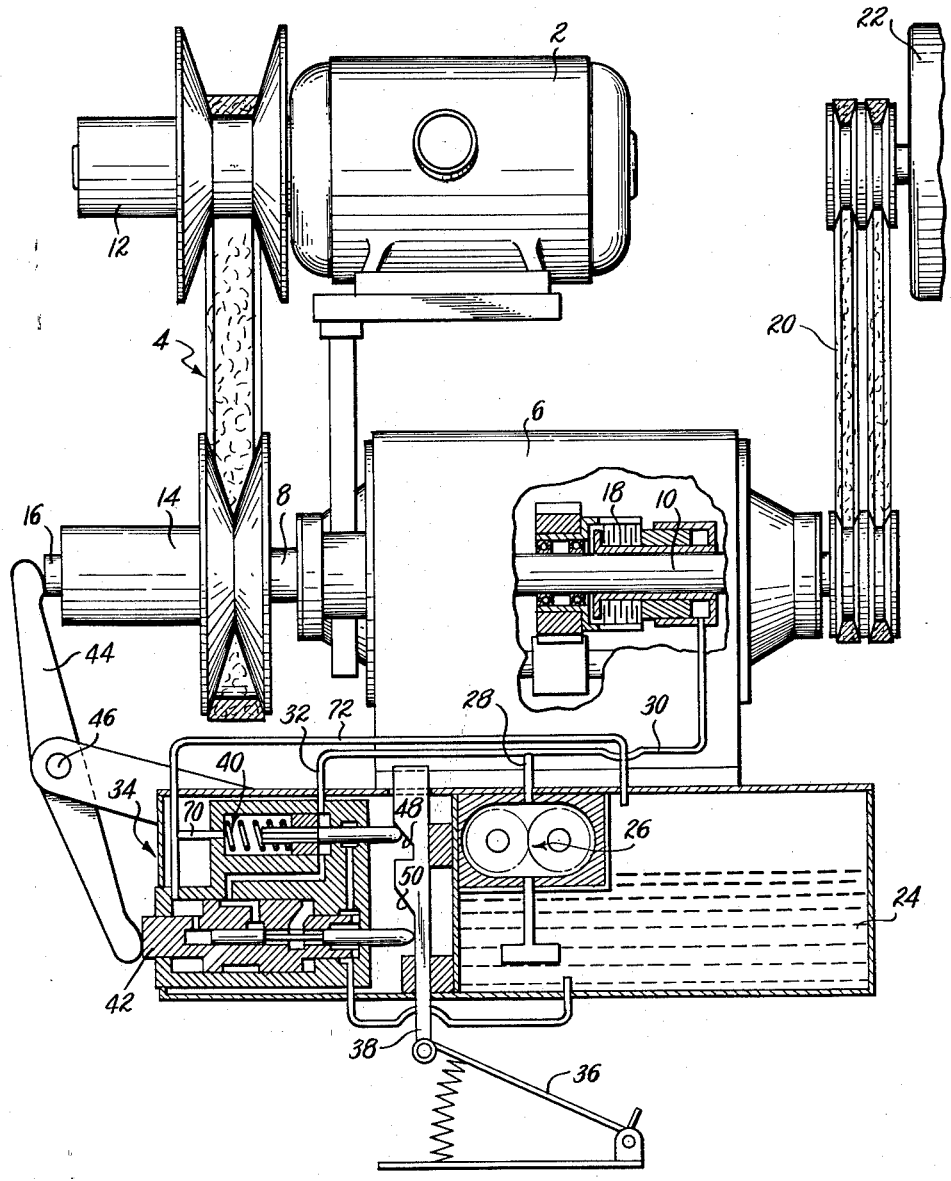
FIG. 1 is a diagrammatic view of the combined features constituting the present invention.

In FIG. 1 there is shown a driving motor 2 which drives through an infinitely variable transmission 4 to a gear box having an input shaft 8 and an output shaft 10. The infinitely variable transmission is illustrated as a well-known variable diameter cone pulley drive wherein each of the pulleys 12 and 14 consists of a pair of side flanges axially movable with respect to each other and urged to their large diameter position by springs, not shown. Such drive is well-known and need not be further described other than to point out that axial pressure on a part thereof, such as shown at 16, will enforce movement of the flanges away from each other against the action of the spring.

The gear box 6 contains any suitable reducing gear arrangement driven by the input shaft 8. The reduction gearing is connected, through a hydraulically operable friction clutch 18 to the output shaft 10 whereby when the clutch is engaged the output shaft 10 is driven in rotation and drives the driven machine 22 through the belt drive 20. As heretofore stated, the plates of the clutch 18 are preferably constantly immersed in a lubricant bath so as to avoid "grabbing" as they are engaging and to effect smooth application thereof with a minimum of wear.

Numeral 24 designates an oil reservoir and 26 designates a gear pump which may be driven by the motor 2. The gear pump 26 draws oil from the reservoir 24 and delivers it to an outlet 28. The outlet 28 is connected through conduit 30 to the hydraulic operating mechanism for the clutch 18 whereby pressure in conduit 30 serves to engage clutch 18. The outlet 28 and conduit 30 are in turn in communication with a conduit 32 extending from the pump outlet to a control valve mechanism to be described but generally indicated by reference numeral 34. The control valve mechanism 34 is responsive to actuation of a treadle 36 connected to a slide 38. The control valve mechanism includes a super-pressure valve 40 and a pressure piston 42. The pressure piston 42

2 bears at its outer end against a lever 44 which rocks on a fixed pivot 46 and presses against the element 16 of variable diameter pulley 14.

In general, the operation is such, as will be described in more detail, that depression of treadle 36 first actuates the valve 40 to build up a back pressure in conduit 32 and thereby reflects that pressure into conduit 30 and clutch 18. As depression of the treadle continues, the pressure applied to clutch 18 is increased to a maximum value at which the clutch is firmly engaged. Thereafter, continued movement of the treadle 36 directs fluid against the pressure piston 42 to cause the same to rock lever 44 and change the effective diameter of pulley 14 to thereupon change the speed ratio from the motor 2 to the gear box 6 in a uniform and gradual manner and to a degree dependent upon the extent of depression of treadle 36. The slide 38 is provided with cam surfaces 48 and 50 which sequentially actuate the valve 40 and piston 42, as will be described.

Figure 3:
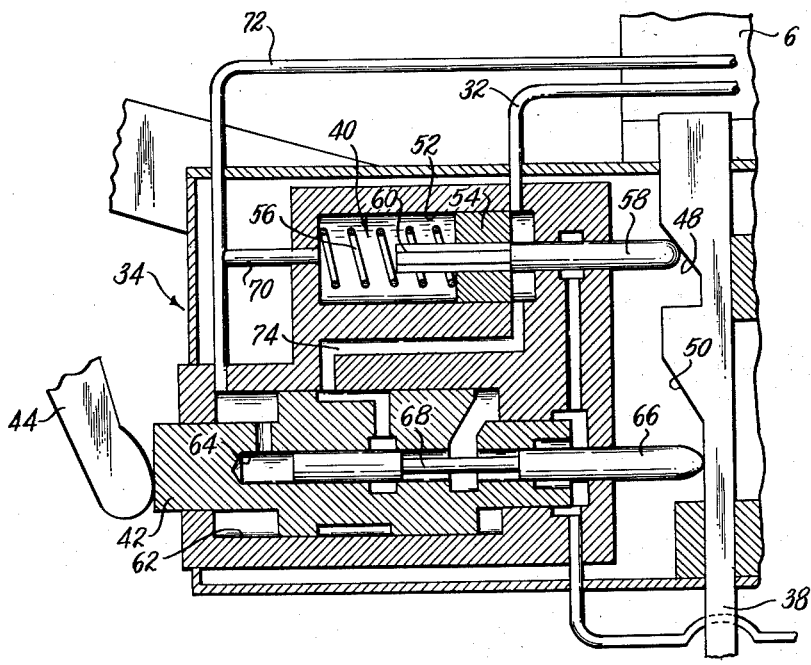
FIG. 3 is an enlarged fragmentary view of a portion of FIG. 1.

By referring to FIG. 3 it will be seen that the super-pressure valve 40 comprises a cylinder 52 and a piston 54 slidable therein. A spring 56 urges piston 54 to the right and plunger 58 extends slidably through piston 54. The plunger 58 is provided at its inner end with grooves 60. The pressure piston 42 slides in a cylinder 62 and is provided with a central bore 64 having a plunger 66 slidable therein. The plunger 66 is provided with a reduced portion 68. Both plungers 58 and 66 have outer ends engageable by the cam surfaces 48 and 50 on slide 38. As is obvious, downward movement of slide 38 first causes cam 48 to engage plunger 58 and actuate the same to the full extend of its possible movement before cam 50 engages plunger 66. With the slide 38 in its uppermost position, the plunger 58 is to the right and pump fluid entering cylinder 52 through conduit 32 exerts enough pressure on piston 54 and moves it to the left against the action of spring 56 enough to partially uncover the ends of the grooves 60 to thereby vent the fluid pressure along those grooves and through conduit 70 and return duct 72. Under these conditions no appreciable back pressure is built up in conduit 32 and so clutch 18 remains disengaged. As the slide 38 moves downwardly, plunger 58 is pushed to the left, thus blocking the vent of pressure fluid and building up pressure in line 32 sufficient to compress spring 56 so as to move piston 54 to the left to again uncover the grooves 60. Thus, it is obvious that the farther plunger 58 moves to the left the higher the back pressure built up in conduit 32 and in friction clutch 18. When the plunger 58 reaches the crest of cam 48, it moves no farther, even upon further movement of slide 38 and the fluid pressure then remains at that value. Before cam surface 50 engages plunger 66, the fluid pressure in cylinder 52 is conducted through passageway 74 into cylinder 62 where it is blocked by the inner enlarged end of plunger 66. However, when cam surface 50 moves plunger 66 to the left, the fluid pressure in passageway 74 then enters around the reduced portion 68 of plunger 66 and is conducted through bore 64 to the right-hand end of cylinder 62 where it exerts its pressure against the pressure piston 42 moving the same to the left until the passageway 74 is again blocked by the inner enlargement on plunger 66. Thus, the position of piston 42 is directly determined by the position of plunger 66. As previously described, movement of piston 42 to the left acts through lever 44 to change the effective diameter of pulley 14, to reduce the same and thus increase the speed at which motor 2 drives gear box 6. Thus, continued downward movement of slide 38 gradually changes the transmission ratio in the infinitely variable transmission 4.

By this arrangement it is obvious that when treadle 36 is released, the clutch 18 is disengaged and pulley 14 is at its maximum diameter. The initial movement of treadle 36 through the first part of its range of movement gradually builds up fluid pressure in the clutch 18 to gradually engage the same and get machine 22 started at a relatively low speed. Continued downward movement of treadle 36 maintains the pressure in clutch 18 and then gradually reduces the effective diameter of pulley 14 to increase the speed of drive of the machine 22.

Figure 2:
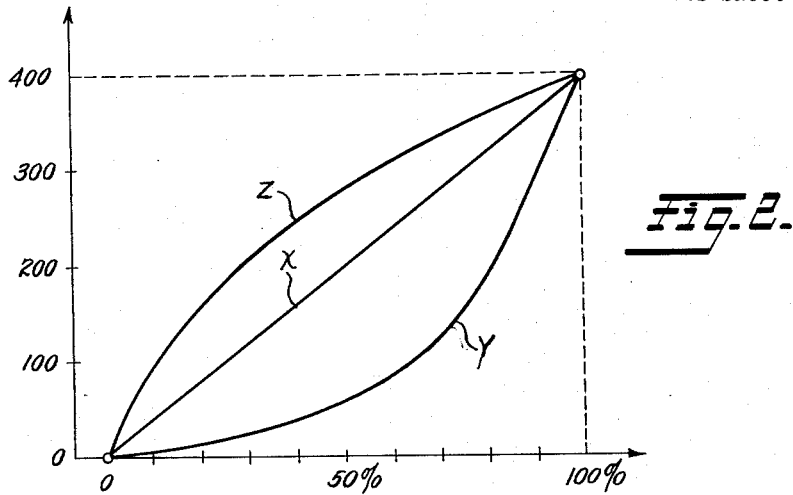
FIG. 2 is a chart illustrating different relationships attainable between movement of the control member and the output speed.

Obviously the cam surfaces 48 and 50 need not be straight-line edges as shown but either or both may be curved either concavely or convexly as desired. The exact form of the cam surfaces will be dependent upon the starting conditions dictated by machine 22. By suitably selecting the shapes of the edges 48 and 50, it is possible to obtain a direct linear relation between the extent of movement of treadle 36 and the speed relationship between motor 2 and machine 22. For instance, FIG. 2 is a chart plotting percentage of movement of treadle 36 against representative speeds of machine 22 in r.p.m. Line X of FIG. 2 illustrates a true linear relationship produced by a straight-line surface 50, assuming the motor rotates at 1500 r.p.m. and a speed reduction is effected in the gears in gear box 6. The line Y represents a relationship that can be achieved where it is necessary to very gradually increase the speed of machine 22 during the initial movement of treadle 36. Such characteristics are obtained by curving the edge 50 to a concave configuration of the required slope. On the other hand the characteristics indicated by the line Z are obtained by a convexly curved edge 50 and produces rapid speed increase during the initial movement of treadle 36 and slower speed increase thereafter.

In the specific embodiment shown, a variable diameter pulley friction belt drive is shown as the infinitely variable transmission but it is to be understood that the transmission may be any other well-known form of infinitely variable device.

Having thus described a preferred embodiment of the invention, it is to be understood that other forms may be resorted to within the scope of the appended claims.

I claim:
1. A driving device for machines, comprising: a power source; an infinitely variable transmission driven by said power source; an output shaft; a hydraulically operable friction clutch for connecting said infinitely variable transmission to said output shaft; hydraulically operable actuating means for changing the ratio of said infinitely variable transmission; a source of fluid pressure; a control member selectively moveable through a predetermined range of movement; a first valve operable by said control member by movement thereof through an initial portion of its range of movement for directing gradually increasing fluid pressure from said source to said friction clutch whereby said clutch is gradually engaged; and a second valve operable by said control member by movement thereof through a later portion of its range of movement for directing fluid pressure from said source to said actuating means for said infinitely variable transmission to thereby vary the drive ratio from said power source to said output shaft.

2. A device as defined in claim 1 wherein said second valve produces a change in said ratio which is substantially a linear function of the movement of said control member.

3. A device as defined in claim 1 wherein said second valve produces a change in said ratio which is a non-linear function of the movement of said control member.

4. A device as defined in claim 1 wherein said control member comprises a manually operable treadle; a cam moveable by said treadle; said first valve being operable by a portion of said cam and comprising a pressure regulating valve.

5. A device as defined in claim 4 wherein said actuating means comprises a cylinder, a piston in said cylinder and a valve moveable by another portion of said cam for admitting fluid pressure to said cylinder.

6. A device as defined in claim 1 wherein said friction clutch is positioned in a lubricant bath.

References Cited in the file of this patent
UNITED STATES PATENTS
2,521,457    Heyer _____ Sept. 5, 1950